Feb. 11, 1969   B. JUSTH ETAL   3,427,090
HOLOGRAM MAGNIFICATION
Filed Oct. 23, 1965
Sheet 1 of 2
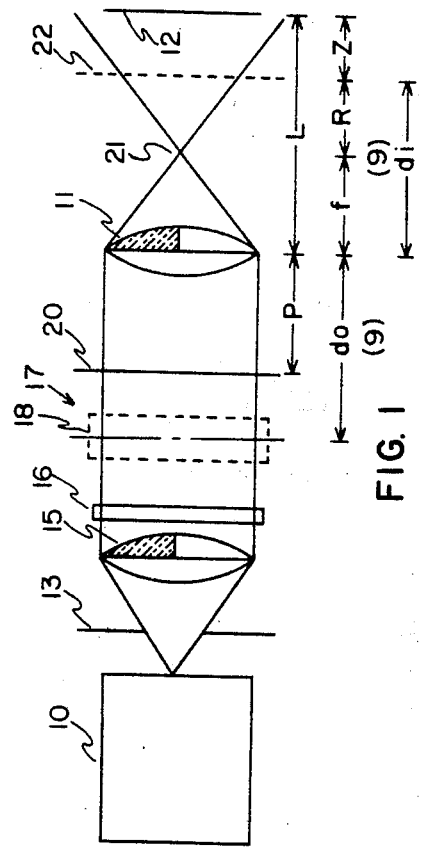
FIG. 1
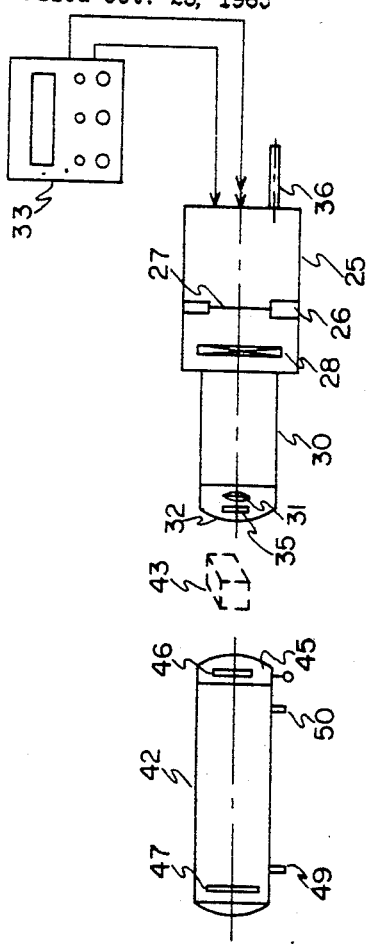
FIG. 2
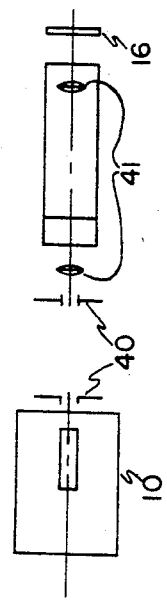
INVENTORS
BRUCE F. JUSTH
WILLIAM R. ZINKY
by Alfred H. Rosen
Thomas N. Tanant
ATTORNEYS

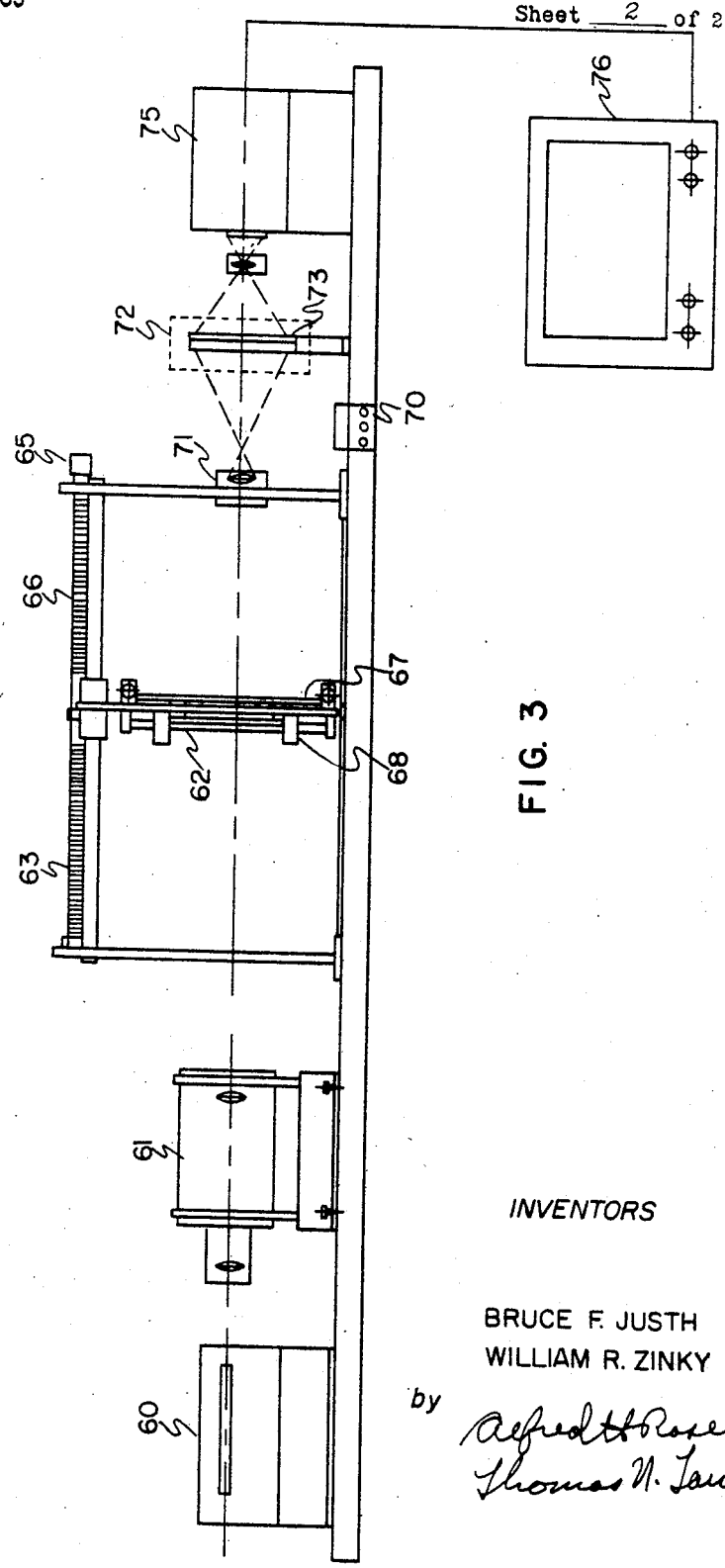

United States Patent Office 3,427,090
Patented Feb. 11, 1969

3,427,090
HOLOGRAM MAGNIFICATION
Bruce Justh, Dayton, Ohio, and William R. Zinky, Bedford, Mass., assignors to Technical Operations, Incorporated, Burlington, Mass., a corporation of Delaware
Filed Oct. 23, 1965, Ser. No. 503,135
U.S. Cl. 350—3.5
Int. Cl. G02b 27/22
5 Claims

ABSTRACT OF THE DISCLOSURE

A hologram recording system in which a lens is used to relay to a recording plane a magnified image of a plane in which a Fraunhofer hologram of the object might have been formed. A magnified hologram of the object is recorded at the actual recording plane with a magnification $$L\frac{-f}{f}$$

where L is the distance between the lens and the recording plane and $f$ is the focal length of the lens.

---

Holograms are used for making photographic recordings in two dimensions of a three dimensional subject such that the three dimensional object can be reconstructed from the single two dimensional recording.

Basically the technique is to illuminate the object with coherent light and photograph a diffraction pattern produced by the coherent illumination. A transparency of this diffraction pattern is then illuminated with similar coherent light and a reconstruction of the original object can be brought to a focus in three dimensional space.

The present nowledge of holograms begins with extensive work by D. Gabor in the late 1940s; and a good description of holograms with reference to Gabor's work can be found in Principles of Optics by Born and Wolf, 2nd edition, 1964, pages 453 to 458.

Patent application Ser. No. 437,876 filed Mar. 8, 1965, described a hologram system for examining particles suspended in a fluid medium. That patent application also described a preferred type of hologram for reducing the interfering ambiguities produced by a conjugate wave. This preferred hologram is described therein as the far field hologram and is defined as a hologram made in the far field of the object (or individual parts thereof) and in the near field of the illuminating beam.

There are still other factors in making holograms that have particular significance in some instances. For example in making holograms of particles suspended in a fluid medium the particles are frequently quite small. Magnification in making the hologram is highly desirable so that the resolving requirements placed on the recording medium and any system used in reconstruction are kept low.

If it is desired to analyze particle size by use of holograms, any magnification must be precisely calculated. When dealing with a three dimensional volume instead of a two dimensional object, varying magnification through the volume can introduce complications.

A further problem, when dealing with small particles and magnification, is that ambient dust etc. and lens imperfections can add ambiguities rendering analysis difficult.

Now in accordance with the present invention, we have reduced some of these problems greatly with a hologram camera using a novel single lens magnification system which provides uniform magnification irrespective of particle position in the subject volume.

Thus it is an object of the invention to define a novel hologram camera.

A further object of the invention is to define a single lens magnification system for uniform magnification in making holograms.

A further object of the invention is to define a method of forming holograms with uniform magnification.

It is still a further object of the invention to define novel means for making magnified holograms of small particles in a fluid volume.

Further objects and features of the present invention will become apparent upon reading the following specification together with the drawings in which:

FIG. 1 is an optical schematic illustration of a hologram camera system in accordance with the invention.

FIG. 2 is a diagrammatic illustration of a hologram camera system according to the invention; and FIG. 3 is a diagrammatic illustration of hologram reconstruction apparatus.

In FIG. 1 hologram camera system is illustrated schematically with laser light source 10, magnifying lens 11, and a recording medium 12. A "stop" or aperture plate 13 together with collimating lens 15 provide a collimated beam and filter 16 reduces undesirable interference from more than a quasi-monochromatic spectrum. Between filter 16 and magnifying lens 11, an object volume 17 is indicated by dashed lines 18. Following the object volume a hologram could be formed without lenses. Hypothetical plane 20 for such a hologram is indicated by a solid line. The collimated beam of light from source 10 is shown as coupling to a point at the back focus 21 of lens 11. Image plane 22 is indicated by a dashed line representing the conjugate foci of points on a plane through the vertical center of the object volume 17.

A somewhat simplified analysis of the optical arrangement shows that magnification at recording medium 12 depends on the focal length "$f$" of lens 11 and the distance "$L$" between the optical center of lens 11 and the recording surface. The position of the object volume or individual parts of the object within the volume has no effect on magnification.

The magnification is a two step process, with the overall magnification given by:

$$M = M_{\text{lens}} M_{\text{spherical wave}}$$

$$M_{\text{lens}} = \frac{di}{do} = \frac{f}{do - f}$$

$$M_{\text{spherical wave}} = 1 = \frac{Z}{r} = 1 + \frac{L - di}{di - f}$$

$$d_i = \frac{f}{do - f}$$

$$M_{\text{spherical wave}} = 1 = \frac{L - di}{di - f}$$

$$= \frac{di - f + L - di}{di - f} = \frac{L - f}{di - f}$$

$$M = \left(\frac{f}{do - f}\right)\left(\frac{L - f}{di - f}\right)$$

$$= \left(\frac{f}{do - f}\right)\left(\frac{L - f}{\frac{dof}{do - f} - f}\right)$$

$$= \left(\frac{f}{do - f}\right)\left(\frac{(L - f)(do - f)}{f^2}\right) = \frac{L - f}{f}$$

Where:
M is magnification,
$do$ is the distance between object 17 and lens 11,
$di$ is the distance between lens 11 and image plane 22,
$f$ is the focal length of lens 11, L is the distance between lens 11 and recording medium 12, R is $d_i - f$, and $Z$ is $L - d_i$.

We thus see that the magnification is independent of particle position. A volume of particles can be recorded in this way with all having the same magnification.

FIG. 1 shows light source 10 as a laser. However the requirement is that the object be illuminated with quasi-monochromatic collimated coherent light. Thus a filtered arc lamp or a filtered vapor lamp can also be used. Pulse lasers are considered desirable since their intensity in terms of usable output for the present purpose is high enough to permit a sufficiently fast exposure to effectively stop object motion.

The illumination used in the present invention is described as "collimated quasi-monochromatic coherent light." "Collimated" is used in its usual sense defining the wave fronts to be straight (rays parallel). "Quasi-monochromatic" is used to describe radiation which produces a diffraction pattern that appears to be the same "as though the radiation were perfectly monochromatic." Interpreting this definition in terms of system geometry, "quasi-monochromatic" describes radiation that consists of spectral components over a frequency range $\Delta \nu$ which is small compared to the means frequency $\bar{\nu}$ and for which path differences do not exceed $$\frac{c}{\Delta \nu}$$

where $c$ is the velocity of light in centimeters per second and $\Delta \nu$ is the spectral width at the half power point is seconds$^{-1}$. "Coherent" is used to describe radiation in which any two discrete portions have a difference in phase represented by a constant during the period normally covered by observations. "Light" is used in its broad sense to cover electromagnetic wave radiation in the general range of frequencies including visible light. The critical zone in which the "light" must meet the above stated requirements is the zone of object illumination. Thus pin hole apertures, collimating lenses and filters can be used between the actual source and the object to achieve the required form of illumination.

One of the many uses to which a hologram camera may be put is to make a hologram in the near vicinity of an explosion for analyzing particle content and distribution in a volume close to the explosive center. A camera which is suitable for such a purpose is illustrated diagrammatically in FIG. 2. The camera itself, designated generally as 25, contains a frame 26 for supporting a photosensitive member such as photographic film 27, a shutter 28, a barrel 30, and a lens 31 supported by barrel 30 at a predetermined distance from film 27. The end 32 of barrel 30 is curved in a spherical manner for strength and to prevent disruption of an explosive cloud passing adjacent to it. Shutter 28 is suitably controlled by synchronizing apparatus 33 which can for example trigger the shutter for operation at a selected time relative to initiation of an explosion. To protect lens 31 an optical flat 35 is positioned in front of lens 31. This optical flat also serves to keep explosive particles and other foreign matter out of the camera assembly.

It has also been found desirable to maintain a positive pressure inside the camera assembly by the introduction of a well filtered inert gas such as helium. An input for such gas is depicted by pipe 36. Further measures can be taken to keep foreign material clear of the optical path for example blasts of well filtered inert gas can be directed against the exterior surface of flat 35 in between explosions. Treatment with a repellent film or the use of electrostatics are also measures which can reduce the collection of foreign material on the optical surfaces. The entire system illustrated in FIG. 2 includes a laser 10, a collimated assembly comprising stops 40, lenses 41, a filter 16 for limiting the spectral output, and a light tube 42.

In taking a hologram of an explosion, flying particles resulting from the explosion disrupt the optical path reducing coherency of the illuminating light. Light tube 42 permits an undisturbed path for the illuminating light up to a point closely adjacent to the object volume depicted by dashed box 43. Light tube 42 is suitably a hollow metal or plastic tube with a spherically contoured cap 45 on at least the end adjacent to the object volume. Optical flats 46 and 47 serve to block the input and output apertures in light tube 42 so that the interior of the tube can be kept free of dust or other foreign matter by the use of an inert gas such as helium. Input and output pipes 49 and 50 are illustrated for introducing and removing such a gas from the tube. As in the case of the camera unit itself, various measures can be taken to keep the exterior surfaces of glass flats 46 and 47 free of contamination.

The camera of the present invention is suitable for making holograms for reconstructing small discontinuities in an object volume under the conditons of "far field diffraction."

Thus the camera system is set up so that the conjugate focal plane 20 of the magnification plane relative to lens 11 in FIG. 1 is consistent with the far field conditions set forth in the aforementioned patent application Ser. No. 437,876. The far field condition is set forth by the relation $Z > 2d^2/\lambda$ where $Z$ is the distance from the diffracting discontinuity to the conjugate focal plane 20; $d$ is the diameter of the largest discontinuity and $\lambda$ is the wavelength of the illuminating source.

At the same time it is necessary in making a far field hologram that the hologram be formed in the near field of the illuminating beam. For the present camera system, the near field for the illuminating beam must satisfy the relation $Z < 2d^2/\lambda$ where $d$ is the diameter of the beam at that plane in the object volume nearest the beam source and $Z$ is the distance from that plane to the conjugate focal plane 20 of the magnification plane.

FIG. 3 illustrates a system for reconstructing the object volume from the magnified hologram. The illuminating system is essentially the same as that of FIG. 2 with a laser light source 60 followed by a collimator 61. Stops and filters as in FIG. 2 can also be used although with some light sources a reasonably good reconstruction can be made without them. A frame 62 for supporting a magnified hologram for reconstruction is mounted in a positioning assembly 63. Positioning assembly 63 contains a motor 65 and drive screw 66 for moving the magnified hologram back and forth along the optical path.

Further drive mechanisms 67 and 68 are connected to frame 62 for moving the hologram in lateral X and vertical Y directions respectively. A motor control unit 70 is connected to actuate the three drive mechanisms. A projection lens 71 forms a reconstructed volume at 72. This reconstructed volume can be shifted in X, Y, and Z directions by the drive mechanisms described above. A pane of frosted glass 73 is suitably positioned at some plane in the reconstructed object volume for examing that particular plane. Different planes in the reconstructed object volume can be examined by moving the magnified hologram back and forth through operation of drive motor 65.

The image appearing on the frosted glass can also be examined by the naked eye or the reconstructed sample volume itself may be viewed without the frosted glass by means of suitable optics or with some difficulty by the human eye.

FIG. 3 depicts one embodiment of a viewing arrangement comprising TV camera system 75 and television monitor 76 for viewing and analyzing a selected plane in the reconstructed volume.

While the invention has been described in relation to specific embodiments, various modifications thereof will be apparent to those skilled in the art and it is intended to cover the invention broadly within the spirit and scope of the appended claims.

What is claimed is:

1. An optical system for making holograms comprising a source of quasi-monochromatic collimated coherent light, a single lens interposed in the beam from said source so as to provide space for an object volume between said source and said lens and means to support a photosensitive medium at a magnification plane in the back field of said lens that contains the conjugate foci of a hologram plane in the front field of said lens, said hologram plane being a plane in which a hologram of said object volume could be formed without lenses, a magnified hologram of said object being recorded at said magnification plane with a magnification $$\frac{L-f}{f}$$

where L is the distance between the lens and the magnification plane and $f$ is the focal length of the lens.

2. An optical system according to claim 1 wherein said lens is a converging lens.

3. Optical apparatus for making a hologram picture of a three dimensional object volume comprising:
   (a) a laser light source;
   (b) a laser collimator having a first end adjacent to said laser light source;
   (c) a laser light tube having a first end adjacent to a second end of said collimator adapted to provide an undisturbed path for light from said source; and
   (d) a hologram camera comprising:
      (1) means to support a photosensitive medium
      (2) a camera barrel
      (3) a single lens, between said means to support a photosensitive medium and a second end of said light tube, said lens mounted in said barrel a predetermined distance in front of said means to support said second end of said light tube and said barrel defining an object volume therebetween.

4. Optical apparatus according to claim 3 in which said light tube and said camera barrel each contain an inert filtered gas at a pressure greater than atmospheric.

5. Optical apparatus according to claim 3 in which said single lens is a converging lens positioned with respect to said object volume and said means to support a photosensitive medium so as to form a hologram at the plane of said means to support having a magnification factor $$\frac{L-f}{f}$$

where L is the distance between said lens and said plane and $f$ is the focal length of said lens.

References Cited

UNITED STATES PATENTS 2,982,176   5/1961   Kay.

NORTON ANSHER, *Primary Examiner.*

R. M. SHEER, *Assistant Examiner.*

U.S. Cl. X.R.

95—1